US009219860B1

(12) United States Patent
Kozko

(10) Patent No.: US 9,219,860 B1
(45) Date of Patent: Dec. 22, 2015

(54) HYBRID PANORAMIC OPTICAL DEVICE WITH EMBEDDED PTZ COMPONENTS

(71) Applicant: IC REAL TECH, LLC, Pompano Beach, FL (US)

(72) Inventor: Dmitry Kozko, Pompano Beach, FL (US)

( * ) Notice: Subject to any disclaimer, the term of this patent is extended or adjusted under 35 U.S.C. 154(b) by 0 days.

(21) Appl. No.: 14/573,754

(22) Filed: Dec. 17, 2014

(51) Int. Cl.
*H04N 5/235* (2006.01)
*H04N 5/232* (2006.01)

(52) U.S. Cl.
CPC ....... *H04N 5/23238* (2013.01); *H04N 5/23261* (2013.01)

(58) Field of Classification Search
None
See application file for complete search history.

(56) References Cited

U.S. PATENT DOCUMENTS

2006/0049350 A1* 3/2006 Teich et al. ............. 250/330

\* cited by examiner

*Primary Examiner* — Andy Rao
*Assistant Examiner* — Tyler Edwards
(74) *Attorney, Agent, or Firm* — Patents on Demand P.A.; Brian K. Buchheit; Scott M. Garrett

(57) ABSTRACT

A fixed surround imaging component (SiC) can capture a field of view (FOV) of between 270° to 360° of a horizontal plane. A movable second camera (SC) component can include a FOV less than the FOV of the SiC and having a resolution or imaging capability greater than that of the SiC. The SC can physically move to change its field of view. Coverage of the movement of the movable SC can enable coverage with movement of the entire FOV of the SiC. An image aggregator can aggregating images from the SiC and SC. The movement of the SC can be linked to a portion of the SiC that is indicated by a human/program as being a segment of the FOV of the SiC of interest, which results in movement of the movable SC to provide higher resolution or greater imaging capability to that segment.

20 Claims, 6 Drawing Sheets

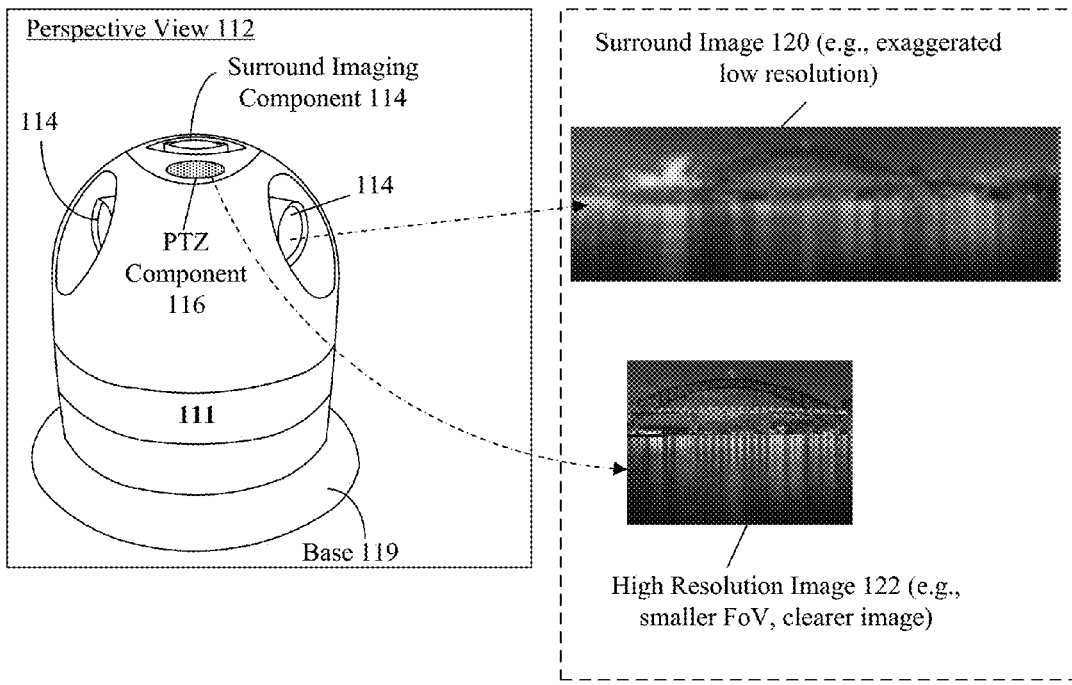
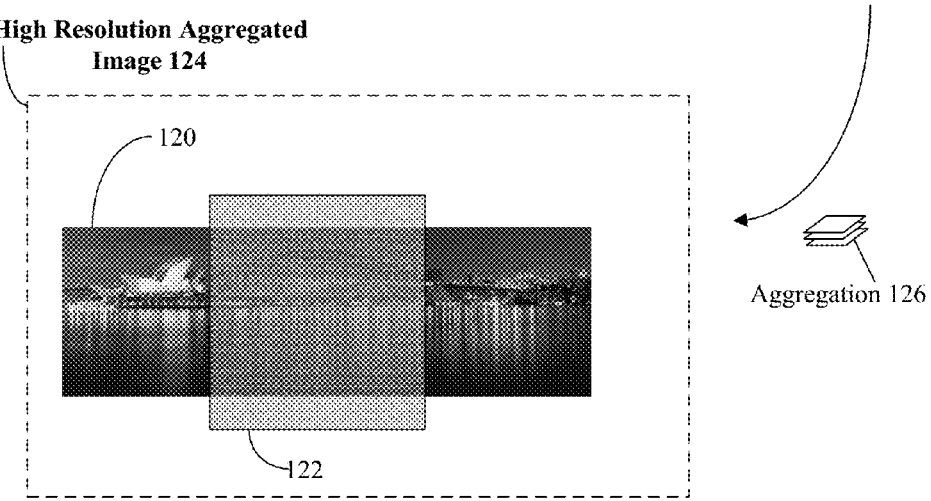
FIG. 1A

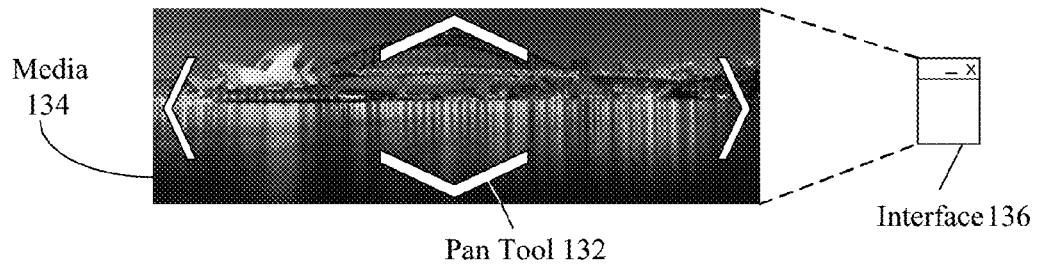
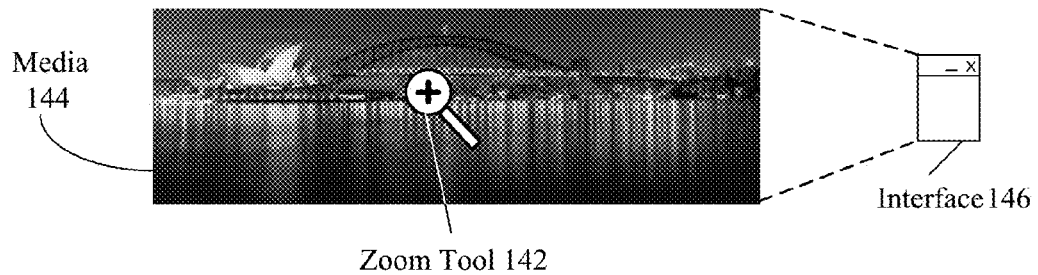
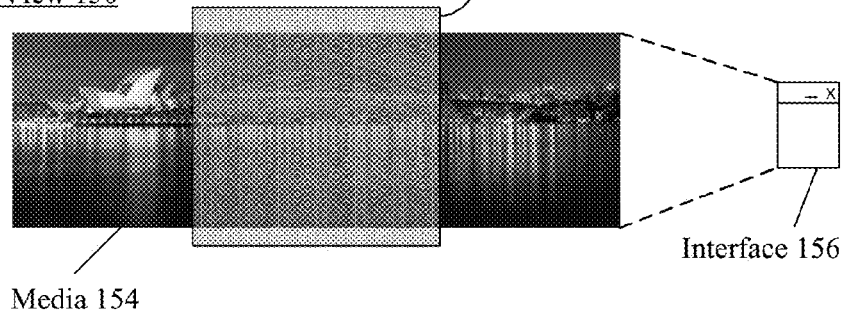
FIG. 1B

300

Hybrid Panoramic Optical Device 310

*Hardware 312*

Surround Imaging Component 320
- Lense Array 322
- Image Sensor 324

PTZ Component 330
- Lense Array 332
- Image Sensor 334

Processor 340
Storage 342
Port(s) 344
Removable Memory 346
Transceiver 348
Storage 350
Mount 352
Power Source 354

*Software/Firmware 314*

Image Preprocessor 360 | Image Postproccessor 362 | Image Combiner 364

Surround Image 370
- Image Segment 372
  - Image Data 374
  - High Resolution Image Data 376
- Image Mapping 378

FIG. 3

Embodiment 410
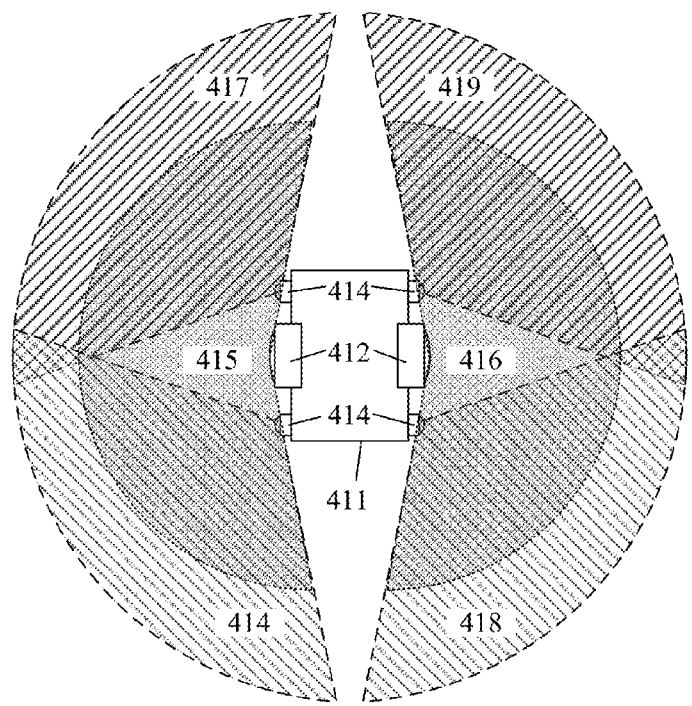
Embodiment 450
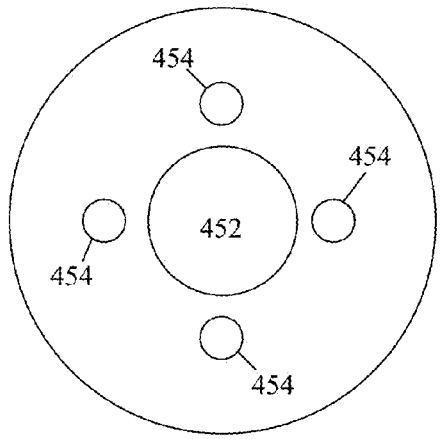
Embodiment 470
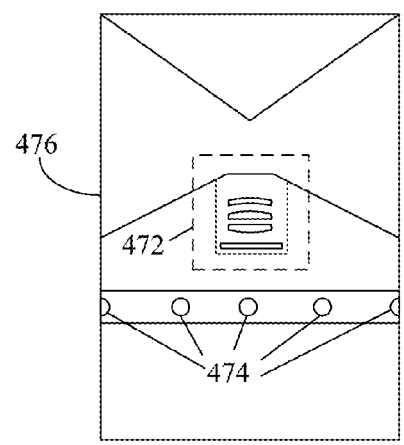
FIG. 4

HYBRID PANORAMIC OPTICAL DEVICE WITH EMBEDDED PTZ COMPONENTS

BACKGROUND

The present invention relates to the field of and, more particularly, to hybrid panoramic optical device with embedded pan/tilt/zoom components.

Surround imaging devices which can include three hundred and sixty degree video/imaging devices such as 360 cameras and 360 video cameras are increasingly useful in many consumer and commercial environments. Surround imaging devices can include panoramic device having less than 360 degree coverage in a plane but greater than 180 degrees of coverage. Further, 360×360 (e.g., 720 degree) cameras that provide surround imagery/video about the device, not restricted to a plane, are increasingly in demand. One of the challenges with surround imaging devices is achieving a sufficiently robust resolution at a viable cost.

BRIEF SUMMARY

One aspect of the present invention can include a method, an apparatus, a computer program product, and a system for a hybrid panoramic optical device with embedded pan/tilt/zoom components. A fixed surround imaging component (SiC) can capture a field of view (FOV) of between 270° to 360° of a horizontal plane. A movable second camera (SC) component can include a FOV less than the FOV of the SiC and having a resolution or imaging capability greater than that of the SiC. The SC can physically move to change its field of view. Coverage of the movement of the movable SC can enable coverage with movement of the entire FOV of the SiC. An image aggregator can aggregating images from the SiC and SC. The movement of the SC can be linked to a portion of the SiC that is indicated by a human/program as being a segment of the FOV of the SiC of interest, which results in movement of the movable SC to provide higher resolution or greater imaging capability to that segment.

Another aspect of the present invention can include a system, a computer program product, an apparatus, and a method for a hybrid panoramic optical device with embedded pan/tilt/zoom components. A field of view of between two hundred and seventy to three hundred and sixty degrees of at least a horizontal plane of a real world environment can be captured. A surround image responsive to the capturing can be produced. The surround image field of view can correspond to approximately two hundred and seventy to three hundred and sixty degrees of within a horizontal plane. A segment of the surround image can be selected. When the segment resolution is determined below a previously established resolution threshold. The segment can be captured in higher resolution. The higher resolution exceeds the previously established resolution threshold.

Yet another aspect of the present invention can include a method, a computer program product, an apparatus, and a system, for a hybrid panoramic optical device with embedded pan/tilt/zoom components. A camera housing can include a cavity and a screw based coupler mount. The cavity can include a fixed surround imaging component and a moveable second camera. The fixed surround imaging component can capture a field of view of between two hundred and seventy to three hundred and sixty degrees of a horizontal plane. The movable second camera component can have a field of view less than the FOV of the surround imaging component and having a resolution or imaging capability greater than that of the fixed surround imaging component. The second camera component can physically move to change its field of view. Coverage of the movement of the movable second camera can enable coverage with movement of the entire field of view of the fixed surround imaging component.

BRIEF DESCRIPTION OF THE SEVERAL VIEWS OF THE DRAWINGS

FIG. 1A is a schematic diagram illustrating an embodiment for hybrid panoramic optical device with embedded pan/tilt/zoom components in accordance with an embodiment of the inventive arrangements disclosed herein.

FIG. 1B is a schematic diagram illustrating a set of views for hybrid panoramic optical device with embedded pan/tilt/zoom components in accordance with an embodiment of the inventive arrangements disclosed herein.

FIG. 3 is a schematic diagram illustrating a system for hybrid panoramic optical device with embedded pan/tilt/zoom components in accordance with an embodiment of the inventive arrangements disclosed herein.

FIG. 4 is a schematic diagram illustrating a set of embodiments for hybrid panoramic optical device with embedded pan/tilt/zoom components in accordance with an embodiment of the inventive arrangements disclosed herein.

DETAILED DESCRIPTION

Figure 2:
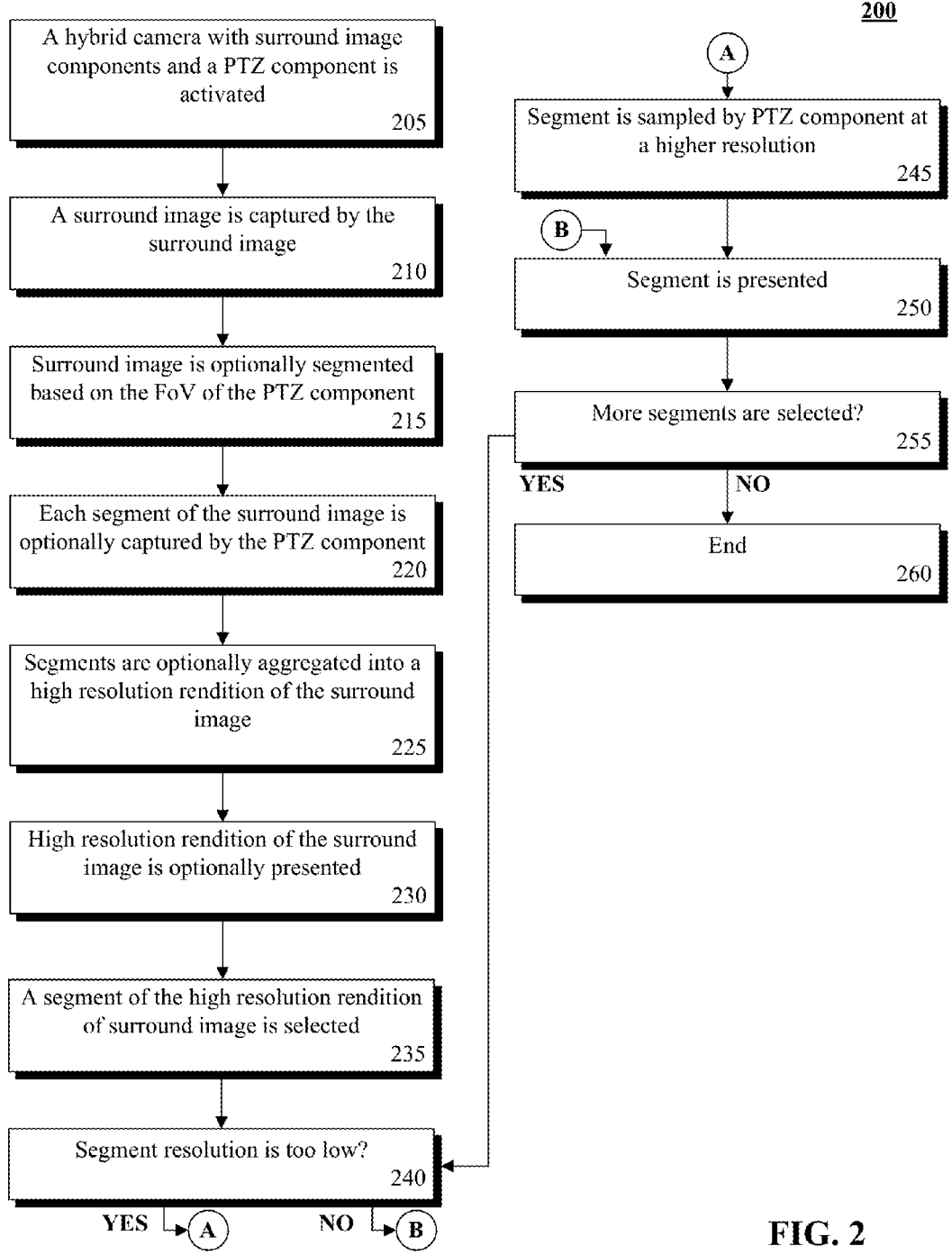
FIG. 2 is a flowchart illustrating a method for hybrid panoramic optical device with embedded pan/tilt/zoom components in accordance with an embodiment of the inventive arrangements disclosed herein.

The present disclosure is a solution for hybrid panoramic optical device with embedded pan/tilt/zoom components. In the solution, a hybrid approach to achieve superior effective resolution in a surround imaging device by using a combination of a surround imaging component and a position-able higher resolution lense is described. In one instance, the surround imaging component can include a single lens (a one-shot camera), two ultra-wide lenses (facing in opposing directions), an array of lenses (positioned at different angles) and the like. In the instance, the positionable higher resolution lense can include pan, tilt, and/or zoom capabilities which can capture the entire field of view of the surround imaging component. In one embodiment, the placement and/or orientation of the positionable higher resolution lense can be configured to maximize resolution gain and minimize device cost/complexity.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1A is a schematic diagram illustrating an embodiment 110 for a hybrid panoramic optical device with embedded pan/tilt/zoom components in accordance with an embodiment of the inventive arrangements disclosed herein. Embodiment 110 can be present in the context of view 130, 140, 150, method 200, system 300, embodiment 410, 450, 470, and/or 510.

Embodiment 110 illustrates a perspective view 112 of a hybrid panoramic optical device 111 (e.g., panoramic camera). It should be appreciated that embodiment 110 is for exemplary purposes only and should not be construed to limit the arrangement and/or capabilities of hybrid camera 111.

As used herein, surround imaging of hybrid panoramic optical device 111 components 114 can include, but is not limited to, a panoramic camera, a 360 degree panoramic camera, a 360 degree camera, and the like. Hybrid panoramic optical device 111 can include surround imaging components 114, PTZ component 116, base 119, and the like. PTZ component 116 can be a camera with pan, tilt, and/or zoom capabilities with a field of view less than or equal to surround imaging components 114. In one instance, PTZ component 116 can capture a discrete portion of a surround imaging 114 field of view. For example, PTZ component 116 can capture a 60 degree field of view within the middle of a 360 degree field of view of a surround imaging component. It should be appreciated that hybrid panoramic optical device 111 can be referred to as a hybrid camera 111.

Referring to FIG. 1, a surround imaging component 114 is shown that has three fixed and substantially opposing lens in accordance with an embodiment of the disclosure. It should be appreciated that the component 114 is not limited to this configuration and can conform to any arbitrary configuration permitting a field of view greater than or equal to one hundred and eighty degrees in a horizontal plane. Lenses 114 can be an wide angle, ultra-wide angle lens able to capture a field of view (FOV) of greater than 180 degrees. An area of overlap can exists for the lenses 114. It should be appreciated that the overlap can be slightly different, as while the lenses 114 face in substantially opposing directions, some variance (+/− five degrees) from opposing direction exists in contemplated embodiments.

A conical volume with a height and a width about the surround imaging components 114 is not covered by lenses 114, and is therefore a known "blind spot" (not shown). Other than this blind spot, a full three hundred and sixty horizontal FOV and a full three hundred and sixty vertical FOV is able to be achieved in embodiments of the surround imaging component using fixed lenses 114. The body of the hybrid camera 111 can be shaped to approximately (within twenty five percent by body volume in one embodiment) minimize blind spots. The body of the optical device 120 therefore minimally blocks or to not block FOV of lense 114.

In one instance, surround imaging components 114 can capture a surround image image 120. In one configuration of the instance, image 120 geometry can correspond to a rectilinear projection, equirectilinear projection, clyindrical projection, spherical projection, stereographic projection, and the like. In the instance, image 120 can correspond to a traditional commercial off the shelf 360 degree camera resolution (e.g., 8-10 megapixel). It should be appreciated that the low resolution of image 120 in FIG. 1A can be exaggerated for illustrative purposes. For example, image 120 can be a 14 megapixel resolution rectilinear panorama.

In the instance, PTZ component 116 can capture a higher resolution image 122 with a smaller field of view (e.g., segment of image 120). That is, the resolution of image 120 can have less image detail than a higher resolution image 122 but with a larger field of view. PTZ component 116 resolution can conform to any arbitrary ratio including, but not limited to, 1.5:1 (e.g., 1.5 times more pixel density than component 116), 2:1, 4:1, and the like.

In one embodiment, multiple images 122 can be aggregated with image 120 to create a high resolution rendition of image 120. In the embodiment, aggregation 126 can utilize one or more image mappings to generate an aggregated image 124. It should be appreciated that aggregated image 120 can include segments of high resolution (e.g., image 122) and segments of low resolution (e.g., image 120)

In this disclosure, a surround imaging component 114 (regardless of the type of surround imaging camera used) can be coupled to a movable camera lens having a higher resolution than the surround imaging component. The optical device can include pan-tilt-zoom (PTZ) functionality in one embodiment. PTZ is an abbreviation for pan, tilt and zoom and reflects the movement options of the camera. Ultra-low bandwidth surveillance streaming technologies, such as TVI from Digital Barriers, use VPTZ to stream user-defined areas in higher quality without increasing overall bandwidth usage. Surveillance cameras of this type are often connected to a digital video recorder which records the full field of view in full quality.

A key to the integration of the surround imaging camera components and the PTZ camera components is use of autotracking for the PTZ components. Autotracking generally refers to an innovation to the PTZ camera is a built-in firmware program that monitors the change of pixels generated by the video clip in the camera. When the pixels change due to movement within the cameras field of view, the camera can actually focus on the pixel variation and move the camera in an attempt to center the pixel fluctuation on the video chip. This process results in the camera following movement. The program allows the camera to estimate the size of the object which is moving and distance of the movement from the camera. With this estimate, the camera can adjust the cameras optical lens in and out in an attempt to stabilize the size of pixel fluctuation as a percentage of total viewing area. Once the movement exits the cameras field of view, the camera automatically returns to a pre-programmed or "parked" position until it senses pixel variation and the process starts over again. The "parked" position of the PTZ camera component can be linked to a specific sub-region covered by the FOV of the surround imaging camera.

In the context of the hybrid camera 111, the surround imaging component continuously captures an entire 360 field of view, where the PTZ component captures a sub-portion of the field of view—and often has to be moved to an area of interest. The area of interest can be manually selected by a user, or can be automatically determined by programmatically analyzing portions of the images captured by the surround imaging component.

The surround imaging component can generate a 360 degree image, which is shown in a user-interactive fashion, such as detailed in view 130, 140, 150.

360 degree panoramic media can be one or more media with an elongated field of view (e.g., rectilinear geometry) such as image 120. It should be appreciated that panoramic media can include photograph that is cropped to a relatively wide aspect ratio. Media showing a field of view approximating, or greater than, that of the human eye (e.g., about 160° by 75°) can be panoramic. That is, an aspect ratio of 2:1 or larger, the media being at least twice as wide as it is high be an exemplary definition of panoramic media. It should be understood that panoramic media can have aspect ratios of 4:1, 10:1, and the like covering fields of view of up to 360 degrees. It should be appreciated that both the aspect ratio and coverage of field are important factors in defining a true panoramic media. In one embodiment, panoramic media can include media captured by a one shot 360 degree panoramic camera. In one configuration of the embodiment, panoramic media can include media exceeding a field of view of 180 degrees.

It should be understood that panoramic images can range in aspect ratio and field of view. Traditional presentation is limited to single image view due to large media sizes (e.g., 24,576×12,288 pixels) and large media file sizes (e.g., 100 Megabytes and larger). The disclosure addresses these limitations and provides a novel way of presenting multiple panoramic images within a user feed. In one embodiment, the disclosure can utilize one or more proprietary algorithms to standardize panoramic media for presentation within a user feed layout. In one configuration of the embodiment, the disclosure can utilize customized image/video manipulation to represent a non 4:3 aspect ratio panoramic media (e.g., 5:1) within a 4:3 aspect ratio. For example, the disclosure can sample a 4:3 aspect ratio sized region of panoramic media to generate a 4:3 thumbnail which can be presented within a user feed. In another configuration, the disclosure can preserve the original aspect ratio of the panoramic media by utilizing traditional media widescreen aspect ratio to standard-width media formats (e.g., letterboxing).

It should be appreciated that the disclosure is not limited to images and can support video. In one embodiment, component 114 can capture videos at 1080p at 15 fps and 720p at 30 fps within a 360 degree field of view. In the embodiment, PTZ component 116 can support 4K (e.g., Quad HD) resolution, permitting PTZ component to provide higher resolution video footage than component 114. It should be appreciated that field of view of component 114 can correspond to 180, 360×180 or 360×360 degree. It should be appreciated that component 116 field of view can correspond up from 10 degrees to 270 degrees.

It should be appreciated that the disclosure is distinctly different from traditional approaches to improving image detail. In one embodiment, the hybrid panoramic optical device can utilize identical exposure settings (e.g., shutter, ISO, f/stop) for the surround imaging component and the PTZ component. In the embodiment, although the attributes (e.g., field of view, f/stop, chromatic aberration, sharpness, focal lenght) of the lenses of the surround imaging component and the PTZ component vary, the disclosure can approximate identical exposure settings to produce near identical exposure matches. That is, when the PTZ component produced image 122 is combined with the surround imaging component produced image 120, minimal to no exposure adjustments can be performed.

FIG. 1B is a schematic diagram illustrating a set of views for a hybrid panoramic optical device with embedded pan/tilt/zoom components in accordance with an embodiment of the inventive arrangements disclosed herein. View 130, 140, 150 can be present in the context of embodiment 110, method 200, system 300, embodiment 410, 450, 470, and/or 510.

View 130, 140, 150 can be associated with a use case. In view 130, 140, 150, the controls for tools 132, 142, 152 change the portion of the surround image having focus. The area of focus (focus region) is within the field of view of the PTZ camera. Thus, as a user interacts with the GUI (interface 136, 146, 156), the PTZ camera repositions itself to provide the high-resolution field of view for the resulting image. There is a brief delay for the repositioning, during which the lower resolution image from the surround image camera is relied upon. Once the field of view (FOV) is covered by the PTZ camera component, the resolution/fidelity sharpens automatically. Thus, a user is always provided an image, which sharpens into focus when the PTZ resulting higher resolution image becomes available. That is, the sharpening comes from the PTZ component having been focused on the area of interest (with higher resolution capabilities).

The above use case assumes a user-interactive process. Other use cases for the hybrid (surround image camera components combined with the PTZ component) are contemplated herein. For example, in many security settings, PTZ cameras are set to track movement (auto tracking as mentioned). This feature is somewhat flawed in that there is always a significant blind spot in the resulting images. For example, in a security situation, movies often show attempts to time crossing a protected area to be out of the FOV of a moving security camera. With the disclosures' camera, this is simply not possible, as an object is always within FOV of the surround imaging (e.g., 360 degree) component. Further, the auto-tracking feature can be improved to follow—focus upon regions determined by analyzing the images resulting from the surround imaging component.

For example, a possible intruder can be detected by noticing time-based changes in a region of the surround image generated by the surround imaging component. The PTZ component can center and focus upon this region of interest (which is a sub-portion of the FOV of the surround imaging FOV), which causes the PTZ camera to physically move. Thus, the hybrid camera results in an optimal combination of no blind spots (which is a problem with a PTZ camera) and with high resolution of areas of interest (which is a problem with surround imaging cameras). Software/firmware can be used to control the motion of the PTZ camera, the aggregation of the image(s) from the cameras, and the user interfaces that result from the above.

In contemplated embodiments, special purpose (moveable and fixed) cameras/detection devices can be integrated as well. For example, a night-vision camera can replace/supplement the high resolution PTZ camera, to receive clear imagery of a portion of a FOV of the surround image FOV in low-lighting conditions. Heat signature camera components can also be integrated with the camera assembly to replace/supplement the high resolution PTZ camera. Use of these specialty cameras in a movable fashion maximizes effective coverage, while minimizing overall costs for this coverage (which the who area coverage is always covered by the comparatively cost effective surround imaging camera.

In interaction view 130, a pan tool 132 can permit panning navigation within media 134. In one instance, media 134 can correspond to an aggregated image 124 which can be presented within interface 136. In one instance, selection of pan tool 132 can trigger a pan operation to be performed. In the instance, the pan operation can query high resolution imagery 122 from PTZ component when resolution and/or image detail of media 134 is below a previously established threshold. In one configuration of the instance, the previously established threshold can be manually and/or automatically set. For example, a pixel density of 200 pixels per inch (ppi) can be manually set by a user to trigger imagery of 200 ppi or greater to be displayed (e.g., imagery obtained from PTZ component 116).

In interaction view 140, a zoom tool 142 can permit zoom navigation within media 144. In one instance, media 144 can correspond to an aggregated image 124 which can be presented within interface 146. In one instance, selection of zoom tool 142 can trigger a zoom operation to be performed. In the instance, the zoom operation can query high resolution imagery 122 from PTZ component when resolution and/or image detail of media 144 is below a previously established threshold. In one configuration of the instance, the previously established threshold can be manually and/or automatically set. For example, a pixel density of 150 pixels per inch (ppi) can be manually set by a user to trigger imagery of 150 ppi or greater to be displayed (e.g., imagery obtained from PTZ component 116).

In interaction view 150, a focus region 152 within the FOV of PTZ component 116 can be illustrated. In the view, media 154 can correspond to a surround image 120 which can be presented within interface 156. In one instance, focus region 152 can permit region 152 to be adjusted after surround image 120 is captured. In one embodiment, region 152 depth of field, resolution, and the like can be dynamically adjusted through the use of imagery 122 obtained from PTZ component 116.

Drawings presented herein are for illustrative purposes only and should not be construed to limit the invention in any regard. It should be appreciated that interaction view 130, 140, 150 can be performed in the context of embodiment 110, method 200, system 300, and/or embodiment 410, 450, 470.

FIG. 2 is a flowchart illustrating a method for a hybrid panoramic optical device with embedded pan/tilt/zoom components in accordance with an embodiment of the inventive arrangements disclosed herein. Method 200 can be present in the context of embodiment 110, view 130, 140, 150, system 300, embodiment 410, 450, 470, and/or 510.

In step 205, a hybrid camera with surround image components and a PTZ component can be activated. In step 210, a surround image can be captured by the surround image component. In step 215, the surround image is optionally segmented based on the field of view of the PTZ component. In step 220, each segment of the surround image can be optionally captured by the PTZ component. In step 225, segments can be optionally aggregated into a high resolution rendition of the surround image. In step 230, a high resolution rendition of the surround image can be optionally presented. In step 234, a segment of the high resolution rendition of the surround image can be selected. In step 340, if the segment resolution is too low, the method can continue to step 245, else proceed to step 250. In step 245, the segment can be sampled by the PTZ component at a higher resolution. In step 250, the segment can be presented. In step 255, if more segments are selected, the method can return to step 240, else continue to step 260. In step 260, the method can end.

Drawings presented herein are for illustrative purposes only and should not be construed to limit the invention in any regard. It should be appreciated that method 200 can be performed in real-time or near real-time. Further, method 200 can be performed in serial and/or in parallel. In one instance, the method 200 can be performed automatically during a image/video acquisition.

FIG. 3 is a schematic diagram illustrating a system for a hybrid panoramic optical device with embedded pan/tilt/ zoom components in accordance with an embodiment of the inventive arrangements disclosed herein. System 300 can be present in the context of embodiment 110, view 130, 140, 150, method 200, embodiment 410, 450, 470, and/or 510.

The panoramic optical device 310 includes hardware 312 and software/firmware 314. The hardware 312 includes, but is not limited to, a surround imaging component 320, a PTZ component 330, a processor 340, storage 342, a set of ports 344, removable memory(s) 346, a transceiver 348, a mount 352, a power source 354, and the like. Surround imaging component 320 can include, but is not limited to, a lense array 322, an image sensor 324, and the like. PTZ component 330 can include, but is not limited to, a lense array 332, an image sensor 334, and the like.

Not all implementations need all hardware 312 components detailed herein. The lenses array 322, 332 can have a visual viewing angle of at least 180 degrees in a direction in which it faces. Each of the lenses arrays can be paired to an image sensor 324, 334 in one embodiment.

The lense array 322 and the lense array 332 can include wide or ultra-wide angle lenses. An ultra-wide angle lens may refer to a lens whose focal length is shorter than the short side of film or sensor. Each ultra-wide lens may be a fisheye lens with curvilinear barrel distortion or a rectilinear lens, which is designed so that straight lines in a scene render straight thereby minimizing barrel distortion.

The image sensors 324, 334 can each be a component that converts an optical image into an electronic signal. Any of a variety of image sensors technologies can be for the first and second image sensors 324, 334 including, but not limited to, semiconductor charge-coupled devices (CCD), active pixel sensors in complementary metal-oxide-semiconductor (CMOS), and N-type metal-oxide-semiconductor (NMOS, Live MOS) technologies.

The ports 344 can include input/output ports for connecting a physical connector. Data and/or power may be conveyed over one or more of the ports 3446. Ports 344 can include, but are not limited to, a universal serial bus (USB) port, a High-Definition Multimedia Interface (HDMI) port, a power port, a IEEE 1394 (FireWire) port, a DisplayPort, an E-SATA port, an Ethernet port, an audioport, and/or alternatives and derivatives thereof.

The removable memory(s) 346 can be a non-transitory (non-volatile) storage that is able to be coupled/decoupled by a user of the hybrid panoramic optical device 310 without significantly breaching integrity of the device's body/casing. The removable memory(s) 346 can include, but are not limited to, a Security digital (SD) card, a SD high capacity card (SDHD), an eXtended capacity (SDXC) card, and/or a SD Input Output (SDIO) in full, mini or micro sizes. Other Flash memory extenders (like a USB flash drive) can be considered removable memory(s) 346 in contemplated embodiments.

The transceiver 348 can be a component able to transmit and receive data over a network, which may be a personal area network (PAN), a local area network (LAN), or a wide area network (WAN). The transceiver 348 can be a wired or a wireless transceiver. The network to which the transceiver links 348 can be a vehicle communication network in one embodiment. In another embodiment, the network of the transceiver 348 can be a stand-alone one capable of independent communication with an IP based network and/or a telephony network without relying upon other in-vehicle networking components.

The processor 340 refers to a central processor unit that is hardware that carries out instructions of a computer program by performing arithmetical, logical, and input/output operations. The processor 340 can be a single core or a multicore processing unit. The processor 340 may be integrated into an integrated circuit, such a system on a chip (SOC) board.

The storage 350 represent data stores able to be physically implemented within any type of hardware including, but not limited to, a magnetic disk, an optical disk, a semiconductor memory, a digitally encoded plastic memory, a holographic memory, or any other recording medium. The storage 350 can be a non-transitory storage medium, which excludes carrier waves, signal mediums, and other forms of energy. Storage 350 can be a stand-alone storage unit as well as a storage unit formed from a plurality of physical devices. Storage 350 can utilize one or more encryption mechanisms to protect stored data from unauthorized access.

The mount 352 is a coupling device/mechanism permitting the panoramic optical device 310 to be secured in space. The mount 352 can be designed for tripod attachment, for attachment to a fixture, a stand for resting on a substantially flat surface, a rod for inserting a rope/string/wire from which device 310 may thereafter be suspended, and the like.

The software/firmware 314 includes stored program instructions able to be executed by the processor 340. Software/firmware 314 can include, but is not limited to, image preprocessor 360, an image combiner 364, and image postprocessor 362. Image preprocessor 360 refers to software that manipulates digital representations of one or more images as captured form either the lense 322 or the second lense 332. Preprocessing functions are executed before images from both lenses 322, 332 are combined into a single image. Image combiner 364 represents program implemented functions for combining images taken from the lenses 322, 332 to form a single panoramic image (e.g., high resolution aggregated image). It should be appreciated that combiner 364 can perform interpolation, extrapolation, stitching, and the like. Image postprocessor 362 represents program implemented functions performed on digital images that have been combined (after image combiner 364 functions have executed). In various embodiments, functions represented by image preprocessor 360, image combiner 364, and/or image postprocessor 362 may be performed on devices external from panoramic optical device 310.

It should be appreciated optical aberrations and/or anomalies can be removed, corrected, and/or minimized through preprocessing, postproces sing, interpolation and the like. Pre/Post processing and/or combining can produce clarity enhancement, exposure improvement, contrast improvement, saturation enhancement, noise reduction, and the like.

The case or body of the panoramic optical device 310 can be designed to be minimally intrusive, so as not to block a line of sight for the lense 322, 332. Whatever blockage occurs (if any) may be intentionally minimized by designing the shape of the panoramic optical device 310. Three such shapes are shown by FIG. 4 embodiments. The disclosure is not to be construed as limited to these shapes, and others are contemplated. Generally, the body of the device can be formed so that it curves backwards from the lenses 322, 332 position permits necessary hardware 312 components to be conveniently housed, while minimizing obstructions of the lenses 322, 332.

In one embodiment, the case or body of the panoramic optical device 310 can be constructed in three distinct sections, each approximately circular or elliptical in cross sectional shape, where the cross sections are orthogonal to a facing direction of the lenses 322, 332. Two outer cross sections can be minor images of each other and can taper towards their endpoints, within which the lenses 322, 332 are mounted/housed. The central cross section can have a cross sectional diameter greater than either of the tapering sections.

The central cross section can be cylindrically shaped or can have an increasing cross sectional diameter to its center or midpoint.

In one embodiment, positive (optically active) elements (if any, such as a transparent encasement containing one or more of the lenses or a portion of a body that light is to penetrate to be captured by one of the lenses 322, 332) the body or casing of the panoramic optical device 310 can be made from polymethyl methacrylate (PMMA, or acrylic), other transparent thermoplastic, glass, or other suitable substances. Negative elements (optically inactive) of the body or casing of the can be made of polycarbonate, other thermoplastic polymers, metal, or other suitable substances.

In one embodiment, device 310 can produce surround image 370 which can include one or more image segments 372. Image segments 372 can be statically and/or dynamically defined. In one instance, segments 372 can be defined by a maximum field of view of a PTZ component 330 at maximum focus distance. In another instance, segments 372 can be defined by a minimum field of view of a PTZ component 330 at a minimum focus distance. It should be appreciated that segments 372 can conform to any arbitrary size and/or geometry. In one embodiment, segments 372 can be uniform and/or non-uniform in size and/or geometry. For example, segments 372 can conform a uniform grid spanning the height and width of surround image 370.

In one instance, image segment 372 can be associated with image data 374 of surround image 370. Image data 374 can include pixel data, image 370 metadata, and the like. In one embodiment, image segment 372 can include a high resolution image data 376 which can be substituted for image data 374. High resolution image data 376 can include pixel data, image data, and the like. In one instance, image 370 can include an image mapping 378 which can map segment dimensions and/or coordinates to a high resolution image data 376 (and vice versa).

FIG. 4 is a schematic diagram illustrating a set of embodiments 410, 450, 470 for a hybrid panoramic optical device with embedded pan/tilt/zoom components in accordance with an embodiment of the inventive arrangements disclosed herein. Embodiment 410, 450, 470 can be present in the context of embodiment 110, view 130, 140, 150, method 200, system 300, and/or embodiment 510.

In embodiment 410, a hybrid panoramic optical device 411 can include a fixed lense and one or more PTZ capable lenses. In the embodiment, the PTZ capable lenses can be arranged to capture the full field of view of the fixed lense. For example, a panoramic camera can include two opposing facing fixed lenses 412 and four PTZ capable lenses 414 arranged to capture an entire field of view of the fixed lenses 415, 416. That is lenses 414 can aggregately capture a field of view 414, 417, 418, 419 which can correspond to the entire field of view of the device 411.

In embodiment 450, a top view of a hybrid panoramic optical device can be illustrated. In embodiment, a panoramic optical component 452 (e.g., 360 degree camera) can be positioned in the longitudinal center axis of the device. In the embodiment, a PTZ lense array 454 can be arranged parallel to the focal plane of the component 452 and around the center axis of the panoramic optical component enabling lense array 454 to capture the entire field of view corresponding to the panoramic optical component 452 field of view.

In embodiment 470, a side view of a hybrid panoramic optical device can be illustrated. In the embodiment, a panoramic optical component 472 (e.g., 360 degree camera) can be positioned in the longitudinal center axis of the device. In the embodiment, a PTZ lense array 474 can be orthogonal to the focal plane of the component 472 and around the center axis of the panoramic optical component enabling lense array 474 to capture the entire field of view corresponding to the panoramic optical component 472 field of view.

It should be appreciated that embodiments 410, 450, 470 are for exemplary purposes only and should not be construed to limit the invention in any regard.

Figure 5:
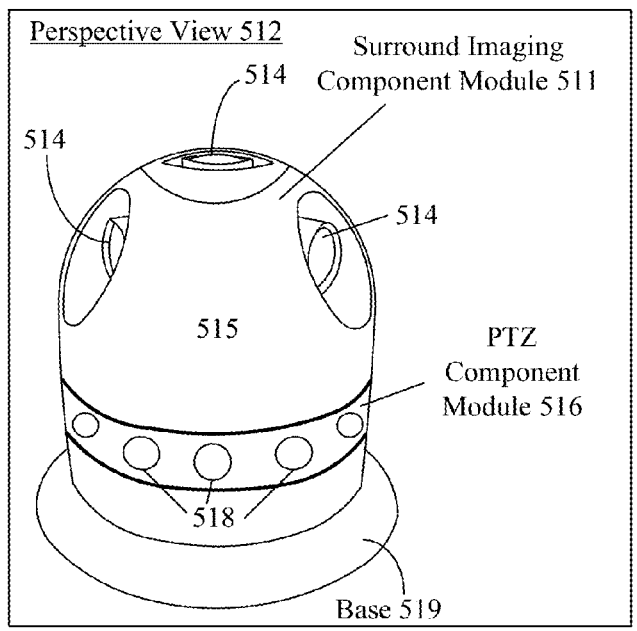
FIG. 5 is a schematic diagram illustrating an embodiment for hybrid panoramic optical device with embedded pan/tilt/zoom components in accordance with an embodiment of the inventive arrangements disclosed herein.

FIG. 5 is a schematic diagram illustrating an embodiment 510 for a hybrid panoramic optical device with embedded pan/tilt/zoom components in accordance with an embodiment of the inventive arrangements disclosed herein. Embodiment 510 can be present in the context of embodiment 110, view 130, 140, 150, method 200, system 300 embodiment 410, 450, and/or 470.

In embodiment, a hybrid panoramic optical device 515 can conform to a modular design, enabling aftermarket user customization of the device 515. In one instance, device 515 can include a surround imaging component module 511, a PTZ component module 516, a base 519, and the like. In the instance, a PTZ component module 516 can be connected to the module 511 and/or camera 515 via one or more traditional and/or proprietary mechanisms. In one configuration of the instance, PTZ component 516 can include PTZ cameras 518 which can be uniformly distributed around the center longitudinal axis of the device 515 permitting module 516 cameras 518 to capture the entire field of view of lenses 514 of module 511.

In one embodiment, device 515 can include a screw based coupling mechanism which can connect the surround imaging component module 511 and the PTZ component module 516. In the embodiment, device 515 modules can be dynamically coupled/decoupled to enable PTZ component module 516 to be added when necessary. It should be appreciated that modules can be synchronized via one or more traditional and/or proprietary mechanisms. In one instance, synchronization can be performed by a image preprocessor 360, image combiner 364, and the like.

The flowchart and block diagrams in the FIGS. 1-5 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A hybrid camera device/system comprising:
   a fixed surround imaging component for capturing a field of view of between two hundred and seventy to three hundred and sixty degrees of a horizontal plane;
   a movable second camera component having a field of view less than the FOV of the surround imaging component and having a resolution or imaging capability greater than that of the fixed surround imaging component, wherein the second camera component physically moves to change its field of view, wherein coverage of the movement of the movable second camera enables coverage with movement of the entire field of view of the fixed surround imaging component;

a user interface showing a surround image to a user of the field of view covered by the fixed surround imaging component; and an image aggregator for aggregating images from the fixed surround imaging component and the movable second camera component, wherein movement of the moveable second camera is linked to a portion of the fixed surround imaging component that is indicated by a human or by a program as being a segment of the FOV of the fixed surround imaging component of interest, which results in movement of the movable second camera to provide higher resolution or greater imaging capability to that segment, wherein the surround image shown in the user interface results from the image aggregator's operations, which includes multiple image segments from the second movable camera that has a shown resolution of at least those segments with high resolution relative to the comparatively low resolution captured using the fixed surround imaging component, wherein the presented surround image as shown in the user interface suffers a brief delay for repositioning of the mobile second camera, during which a comparatively lower resolution from the fixed surround imaging component is relied upon, wherein once the field of view of the presented surround image is covered by the movable second camera, the image aggregator sharpens fidelity of the corresponding portion of the surround image automatically ensuring the user is provided the surround image that sharpens into focus when higher resolution content becomes available for presentation within the user interface.

2. The camera device of claim 1, wherein the moveable second camera component capabilities comprise at least one of a pan, tilt, and zoom.

3. The camera device of claim 1, wherein the moveable second camera component is embedded within the fixed surround imaging component.

4. The camera device of claim 1, wherein the fixed surround imaging component is a 360 degree panoramic camera and the moveable second camera component is a PTZ camera.

5. The camera device of claim 1, wherein the image aggregator is a software algorithm executing within a processor residing within the camera device.

6. The camera device of claim 1, wherein the image aggregator conveys a high resolution image to a proximate or remote computing device responsive to the aggregating.

7. The camera device of claim 1, wherein the device comprises of a housing, wherein the housing includes a screw based coupler mount.

8. A method for a hybrid camera device comprising:
capturing a field of view of between two hundred and seventy to three hundred and sixty degrees of at least a horizontal plane of a real world environment using a fixed surround imaging component having a first resolution capacity;

producing a surround image responsive to the capturing, wherein the surround image field of view corresponds to approximately two hundred and seventy to three hundred and sixty degrees of within a horizontal plane;

showing an initial version of the surround image within a user interface responsive to the capturing, wherein the surround image field of view corresponds to approximately two hundred and seventy to three hundred and sixty degrees of within a horizontal plane;

selecting a segment of the surround image;

determining the segment resolution is below a previously established resolution threshold, which is deficient in part due to the first resolution capacity of the fixed imaging component;

dynamically capturing the segment in higher resolution using a movable second camera component having a field of view less than the FOV of the surround imaging component and having a resolution or imaging capability greater than that of the fixed surround imaging component, wherein the higher resolution exceeds the previously established resolution threshold, wherein the initial version surround image as shown in the user interface suffers a brief delay for repositioning of the mobile second camera component, during which a comparatively lower resolution from the fixed surround imaging component is relied upon, once the field of view of the presented surround image is covered by the movable second camera and once the dynamically captured higher resolution segment is processed by an image aggregator, an updated version of the surround image is automatically shown that sharpens fidelity of a portion of the surround image corresponding to the captured higher resolution segment ensuring a user who is provided with the updated version of the surround image that automatically sharpens into focus when higher resolution content becomes available for presentation within the user interface.

9. The method of claim 8, wherein the selecting is automatically performed during a presentation of the surround image within an interface.

10. The method of claim 8, wherein the selecting is performed by a human agent within a computing interface.

11. The method of claim 8, further comprising:
responsive to the producing, automatically dividing the surround image into segments approximately equal to a previously established field of view;
for each segment, sampling the segment at a resolution greater than the resolution of the surround image.

12. The method of claim 11, further comprising:
aggregating each sampled segment into a high resolution rendition of the surround image.

13. The method of claim 8, further comprising:
receiving a zoom command from an interface presenting the surround image, wherein the zoom command is associated with a segment of the surround image; and
responsive to the receiving, conveying a command to a PTZ camera embedded within a hybrid camera to sample the segment associated with the zoom command.

14. A system for a hybrid camera device comprising:
a camera housing comprising of a cavity and a screw based coupler mount, wherein the cavity comprises a fixed surround imaging component and a moveable second camera;
the fixed surround imaging component for capturing a field of view of between two hundred and seventy to three hundred and sixty degrees of a horizontal plane;
the movable second camera component having a field of view less than the FOV of the surround imaging component and having a resolution or imaging capability greater than that of the fixed surround imaging component, wherein the second camera component physically moves to change its field of view, wherein coverage of the movement of the movable second camera enables coverage with movement of the entire field of view of the fixed surround imaging component; and an image aggregator for aggregating images from the fixed surround imaging component and the movable second camera component, wherein a surround image from the fixed surround imaging component is shown in a user interface, wherein an updated version of the surround image res from the image aggregator's operations, which includes multiple image segments from the second movable camera component that has a shown resolution of at least those segments with high resolution relative to the comparatively low resolution captured using the fixed surround imaging component, wherein the updated surround image as shown in the user interface suffers a brief delay for repositioning of the mobile second camera and processing by the image aggregator, during which a comparatively lower resolution from the fixed surround imaging component is relied upon, wherein once the field of view of the presented surround image is covered by the movable second camera, the image aggregator sharpens fidelity of the corresponding portion of the surround image automatically ensuring a user of the user interface is provided the surround image that sharpens into focus when higher resolution content becomes available for presentation within the user interface.

15. The camera device of claim 14, wherein the moveable second camera component capabilities comprise at least one of a pan, tilt, and zoom.

16. The camera device of claim 14, wherein the moveable second camera component is embedded within the fixed surround imaging component.

17. The camera device of claim 14, wherein the fixed surround imaging component is a 360 degree panoramic camera and the moveable second camera component is a PTZ camera.

18. The camera device of claim 14, wherein the image aggregator is a software algorithm executing within a processor residing within the camera device.

19. The camera device of claim 14, wherein the image aggregator conveys a high resolution image to a proximate or remote computing device responsive to the aggregating.

20. The camera device of claim 14, wherein the device comprises at least one of a processor, a bus, a transceiver, a storage, a removable memory, a power source and a port.

* * * * *